July 5, 1949.　　　　J. M. ROBERTS　　　　2,475,461
ELECTRIC REMOTE-CONTROL SYSTEM
Filed Feb. 12, 1945　　　　　　　　　　　　　2 Sheets-Sheet 1
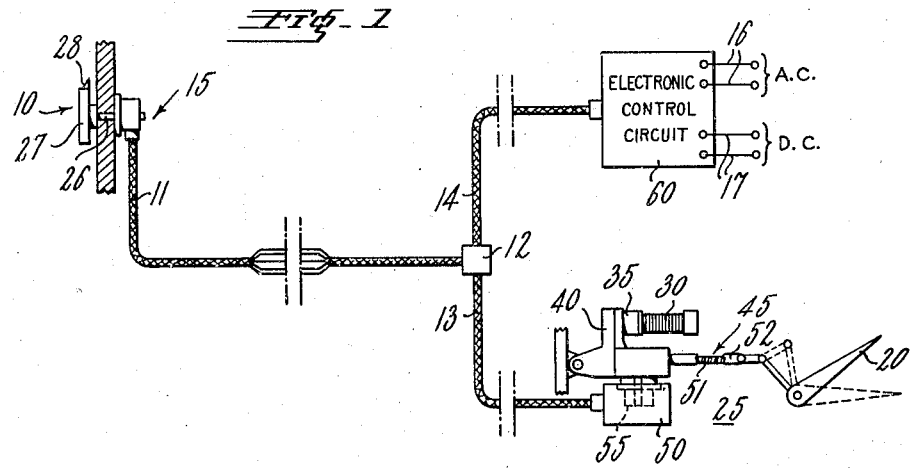
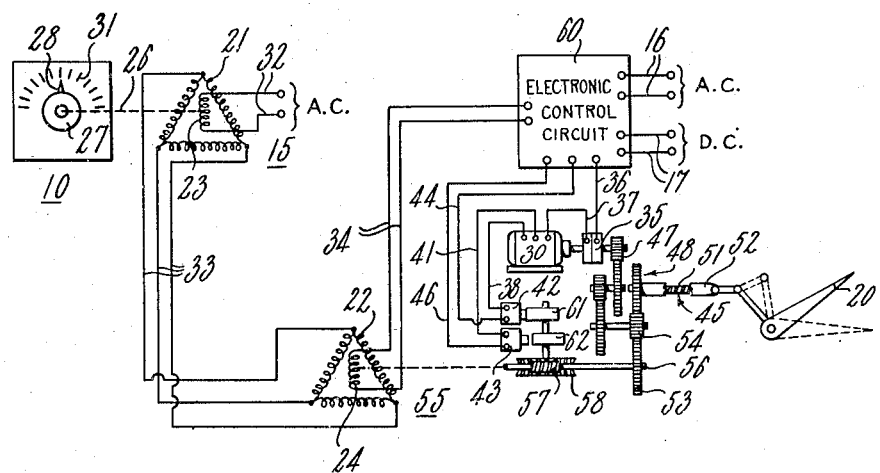
INVENTOR.
JEAN M. ROBERTS
BY
ATTORNEY July 5, 1949. J. M. ROBERTS 2,475,461
ELECTRIC REMOTE-CONTROL SYSTEM
Filed Feb. 12, 1945 2 Sheets-Sheet 2
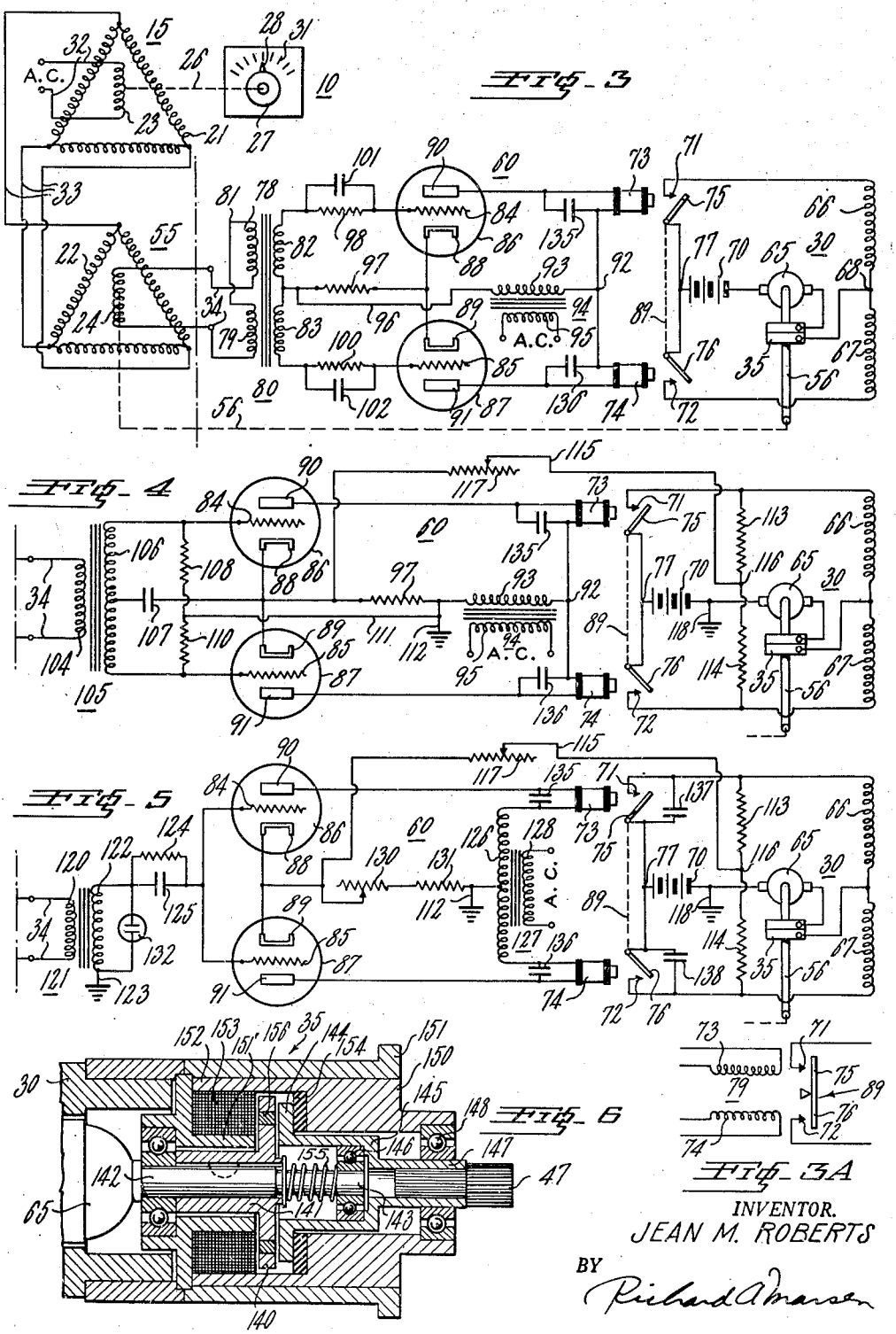
INVENTOR.
JEAN M. ROBERTS
BY
ATTORNEY Patented July 5, 1949

2,475,461

UNITED STATES PATENT OFFICE 2,475,461

ELECTRIC REMOTE-CONTROL SYSTEM

Jean M. Roberts, Ridgewood, N. J., assignor, by mesne assignments, to Lear, Incorporated, Grand Rapids, Mich., a corporation of Illinois Application February 12, 1945, Serial No. 577,425

7 Claims. (Cl. 318—30)

This invention relates to electrical remote control systems, and more particularly to such systems including electronic control means for stably following up the movement of a position selector.

The system of the present invention is particularly applicable to the remote control of the position of movable accessories on aircraft, for instance throttle controls, wing flaps, cowl flaps, landing gears, intercooler shutters, propeller speed governors, etc. On the larger aircraft, such movable accessories are usually positioned by means of a power driven linear actuator, the operation of which is remotely controlled from a position adjacent the pilot's compartment. The present invention provides presettable positioning or follow up control of the driven member throughout its positionable range.

Electrical motor drive systems are replacing the more bulky hydraulic systems in many instances on aircraft. The present invention provides continuous remote positioning control of the available motors on aircraft actuators, whether operated from a low voltage direct current or higher voltage 400 cycle source. To save excessive drain on the power source, the control system is designed so that the power is used by the actuator motor only during its actual operating periods. Furthermore, there is a wide variety in the sizes and types of drive motors used aboard a modern aircraft. Under certain conditions, the use of direct current motors may be indicated; and under other conditions, alternating current motors. Each motor must be particularly designed for its particular application on an aircraft, taking into consideration the type of power economically available thereon, the load, and other conditions.

The principles of the present invention are applicable to any type or size of motor to be controlled, affording smooth and rapid operation of the controlled member, accurately to its new positions. The pilot need merely turn a dial to the required indicated position, and the motor is controlled to effect that new position of the member. No "stand-by" or other current is required to flow through the motor during non-operating conditions. Thus no power is wasted, nor is the motor ambient temperature raised. This feature is essentially provided through the use of a relay control of the motor, as will be set forth hereinafter.

Another important feature is the provision of novel effective anti-hunt or stability characteristics in the motor control system. In accordance with the invention, a signal or electrical effect produced as a result of the operation of the position selector, per se, is combined with the positioning or input signal to the electronic control means. This effects an "anticipation" for the control of the final position, and eliminates hunting in the drive system. Also, an electromagnetic clutch and brake unit is interposed between the motor and the actuator that abruptly disconnects the motor from the actuator as it approaches the final position, and also rapidly arrest motion of the actuator and driven member. Successive energization and deenergization of the clutch, brake and motor is afforded by the anticipation control to effect a stepping or chattering-in of the member to its final position. The clutch and brake unit is particularly effective in small, or "inching" movements as it disconnects the motor from the actuator and abruptly stops the latter. This further stabilizes the control system and can be made to effect rapid control movements on the member without hunting. Such stabilizing anticipation means is effective particularly for the relay controller for the motor, and renders such controller practical and feasible, particularly on aircraft.

It is among the objects of the present invention to provide an improved manual or automatic remote positioning control system including electronic follow-up means; to provide such a system which will insure rapid accurate positioning of a movable member driven by an electric motor; to provide such a control system having a narrow "dead" or back-lash zone, while, at the same time, having maximum sensitivity to small displacements of the position selector; to provide such a system which is universally applicable irrespective of the type and size of motors to which it is applied or of the type of motor power supply available; to provide such a system in which a signal derived in response to operation of the position selector is combined with the input signal to insure stability and anti-hunt characteristics in the system; to provide such a system including means for disconnecting the driving motor from the actuator and abruptly stopping the latter when the positionable accessory is in coincidence with the position selector; to provide such a system in which no stand-by current is required for the drive motor; and to provide such a system which includes relatively few parts and is light in weight, simple and reliable in operation for all types of aircraft or flight conditions.

These and other objects, advantages and features of the invention will be apparent from the following description and the accompanying drawings. In the drawings:

Fig. 1 is a schematic view of one embodiment of a remote positioning control system for a power actuated aircraft accessory, in accordance with the present invention.

Fig. 2 is a schematic diagram of the remote positioning control system shown in Fig. 1.

Fig. 3 is a schematic wiring diagram illustrating one embodiment of the electronic control circuit for the remote control system shown in Figs. 1 and 2.

Fig. 3A is a schematic view of a differential relay used with the invention system.

Fig. 4 is a schematic wiring diagram illustrating another embodiment of the electronic control circuit.

Fig. 5 is a schematic wiring diagram illustrating still another embodiment of the electronic control circuit.

Fig. 6 is a longitudinal section view through an electromagnetic clutch and brake unit for the motor used in the control system.

Generally speaking, the system of the present invention comprises a position selector operatively connected to a signal transmitter. The selector is effective to preselect the position of a movable member that is positioned by an actuator driven by an electric motor. A signal receiver is operatively associated with the actuator or the movable member, and electronic control means is provided connecting the signal receiver and signal transmitter. The control means is operative, upon receipt of an input signal due to movement of the position selector, to selectively operate relay means to energize the actuator motor for operation in the direction to restore coincidence between the position selector and the movable member. When the movable member attains coincidence with the position selector, the electronic control means operates the relay means to disconnect the motor from its source. To avoid hunting of the movable member on either side of such coincident position, counter signals responsive to the operation of the position selector and of the motor are combined wtih the input signal to effect accurate stopping of the actuator at such coincident position. The anti-hunt characteristics of the system are further improved by the use of an electromagnetic clutch and brake unit between the motor and actuator which operates to substantially instantaneously stop the actuator upon deenergization of the motor, affording accurate control in small or "inching" movements of the movable member.

Referring to the drawings, the system illustrated in Fig. 1 includes a position selector 10 operatively connected to a position signal transmitter 15. The position selector is arranged to control the position of a movable member 20 which may, for instance, be a wing flap of an aircraft. Movable member 20 is power operated by means of an actuator unit 25, which may be of the type described and claimed in the copending application Serial No. 483,515, filed April 17, 1943, now Patent 2,469,269, for "Unitary mechanical actuator device" by William P. Lear, and assigned to the same assignee as this case. As described in said copending application, actuator unit 25 includes a motor 30 connected through an electromagnetic clutch and brake unit 35 and gear train 40 to a jack screw 45. A control box 50 is included in the actuator assembly and contains limit switches, and in the present case, a position signal receiver 55. A multi-conductor cable 11 connects signal transmitter 15 to a junction box 12, which, in turn, is connected by multi-conductor cables 13 and 14 to control box 50 of actuator unit 25 and electronic control circuit unit 60. Leads 16 connect unit 60 to a source of alternating current and leads 17 connect the unit to a source of direct current.

Fig. 2 is a schematic showing of the components of Fig. 1. The transmitter 15 and receiver 55 are shown as "Selsyn" units including multi-phase stator windings 21 and 22, respectively, and rotor windings 23 and 24, respectively. Transmitter rotor winding 23 is adapted to be angularly displaced within stator windings 21, relative to receiver motor winding 24, by a shaft 26 which is connected to selector 10, which may include a knob 27 having a pointer 28 adapted to cooperate with indicia 31.

A source of alternating current is connected to rotor winding 23 through leads 32. Due to the transformer action between rotor winding 23 and stator windings 21, sinusoidal alternating fields are set up in stator windings 21. Leads 33 symmetrically interconnect stator windings 21 and 22 so that sinusoidal fields, corresponding in space and time relation with those in stator windings 21, are set up in stator windings 22 of unit 55. When rotor windings 23 and 24 have a relative angular displacement of 90 electrical degrees within their respective stator windings, no voltage is induced in receiver rotor winding 24.

When transmitter rotor winding 23 is angularly displaced from such 90° or "null" relation with respect to rotor winding 24, as through actuation of knob 27 to preselect a new position for member 20, an output voltage is induced in rotor winding 24. Leads 34 from winding 24 introduce this output voltage as an input signal or control voltage to electronic control circuit 60.

The magnitude of the resultant control voltage is proportional to the sine of the relative angle of displacement from null; and the phase of this control voltage is in-phase or 180° out-of-phase with the reference or source input to winding 23, dependent on the sense of the angular displacement. The control signal effects operation of the control circuits in unit 60 to effect selective connection of motor 30 to its source of power as will be described.

Motor 30 is connected to its source of power over a circuit which includes an energizing winding for electromagnetic clutch and brake unit 35 in circuit connection with the motor. For this purpose, where a series motor is used, one terminal of unit 35 is connected to unit 60 through lead 36, and the other terminal is connected to motor 30 through lead 37. The other two terminals of motor 30 are connected through leads 38 and 41 to terminals of limit switches 42 and 43. Leads 44 and 46 connect the other terminals of limit switches 42 and 43 to control unit 60. Energization of motor 30 and clutch and brake unit 35 connects motor 30 to a drive pinion 47. Drive pinion 47 operates jack screw 45 through a system of pinions and spur gears indicated generally at 48.

Gearing 48 causes jack screw 45 and member 20 to be operated at its proper reduced rate of speed with respect to motor 30. As described in said copending application Serial No. 483,515, jack screw 45 includes a screw member 51 having threaded engagement with a sleeve member 52. Relative rotation of jack members 51 and 52 effects extension and retraction of the jack screw to operate member 20. A spur gear 53 driven by a pinion 54, operates a shaft 56 connected to rotor 24 of unit 55. A worm 57 meshes with a worm gear 58 operating a pair of cams 61 and 62 which in turn cooperate with limit switches 42 and 43. Switches 42 and 43 may be so set that cams 61 and 62 will effect opening of the motor circuit when member 20 or jack screw 45 has reached its limit of operation in either direction, and as determined by the setting of the switches 42 and 43.

As explained above, when there is a relative angular difference from null in the position of rotor windings 23 and 24, a voltage is induced in rotor winding 24 proportional to the relative phase displacement from null of windings 23 and 24 within their respective stator windings. The voltage thus induced in winding 24 is applied through leads 34 to control unit 60 where, through connections to be described, it effects actuation of a differential relay for connecting motor 30 and clutch-brake unit 35 to a source of power for operation in a direction to restore coincidence between selector 10 and member 20. Unit 35 couples motor 30 to drive jack 45 through pinion 47 and gearing 48. At the same time, gear 53 and shaft 56 rotate receiver rotor winding 24 in correspondence with the movement of movable member 20.

When member 20 has reached the position corresponding to that indicated by pointer 28 of knob 27, receiver rotor winding 24 is geared to be in null phase relation with rotor winding 23. When rotor windings 23 and 24 thus attain their null relation, the output or control signal voltage across its terminals will have decreased in value to zero. Hence, there will be no signal input through leads 34 to unit 60. The effect of the rotor windings reaching a "null signal" position is to deenergize motor 30 and clutch 35 effecting substantially instantaneous stopping of movable member 20 due to the braking action of unit 35 on actuator 25. Due to gearing 48, 53 and 54, rotor winding 24 is moved at a greatly reduced rate with respect to the rate of rotation of the armature of motor 30. To avoid any ambiguity of positioning, position transmitter rotor 23, and therefore position receiver rotor 24, designed to move in correspondence therewith, are not displaced more than 180° from null for the full range of control movement on member 20.

An important feature of the present invention is the impressing of a counter or "anticipatory" signal upon electronic control unit 60 corresponding to the relative displacement of position selector 10 with respect to movable member 20. Such counter signal is combined in control unit 60 with the control signal from receiver 55. The effect of the counter signal is to reduce the effective value of the control signal applied to unit 60 through leads 34 and effect the deenergization of motor 30 somewhat before member 20 has moved into coincidence with selector 10. As will be made clear hereinafter, this effects a "stepping-in" of member 20 to the "null" or final position, inhibiting overshooting or hunting. In effect, the null zone is temporarily broadened. By the null zone is meant the relative positions of position selector 10 and movable member 20, and consequently of transmitter 15 and receiver 55, in which these members are substantially in 90° phase relation. When the members approach the null position, the effective control signal has been greatly reduced and in the null zone the control signal has a value generally below that required to effect operation of control unit 60.

Another feature of the present invention, preferably combined with the aforementioned feature, is that of impressing a counter or "anticipatory" signal upon electronic control unit 60 in response to energization of motor 30. This feature is important in broadening the null or dead zone immediately after energization of motor 30. This results in stability for small displacements of position selector 10 with respect to movable member 20 and permits the use of a very narrow null or dead zone, thus sharpening the sensitivity of response of the control system.

Fig. 3 illustrates a control and anti-hunting arrangement for motor 30 as included in unit 60. Motor 30 is shown as a direct current series motor comprising an armature 65 and reversely wound field windings 66 and 67. One motor armature terminal is connected to one terminal of a source of direct current 70 indicated by the leads 17 in Figs. 1 and 2. The other motor armature terminal is connected to a common junction point 68 of field windings 66 and 67. The other terminals of the field windings are connected respectively to front contacts 71 and 72 associated with operating coils 73 and 74 of a differential relay 79 shown in Fig. 3A. Relay armature sections 75 and 76 are commonly connected to the other terminal of source 70 through junction point 77. It will be noted that the energizing winding of clutch and brake unit 35 is connected in series with motor armature 65 and field windings 66 and 67.

While relay operating coils 73 and 74 have been shown as separate relays in Fig. 3, and also in Figs. 4 and 5, this is merely for convenience and clarity of illustration. Both coils are part of a single differential relay 79, such as shown schematically in Fig. 3A. This differential relay includes operating coils 73 and 74, a pivoted armature 89 including armature sections 75 and 76, and front contacts 71 and 72, each operatively associated with one armature section. Pivoted armature 89 is indicated in Fig. 3 by dotted line 89 interconnecting the pivoted points of armature sections 75 and 76, which sections have been shown separated in Fig. 7 for convenience of illustration.

Engagement of relay armature section 75 or 76 with either contact 71 or 72 will cause motor 30 to be energized through one field winding 66 or 67 for selective operation in reverse directions. The use of differential relay 79 with the control circuit of the invention, together with secondary relays when current ratings require, permits any current type, or size, of motor to be used for motor 30, depending upon the particular source of power economically available and the particular application for which the motor is intended.

The terminals of rotor winding 24 are connected through leads 34 to corresponding terminals of the primary windings 78 and 79 of a transformer 80. The other corresponding terminals of the primary windings are interconnected by conductor 81. Thus, rotor winding 24 is connected in parallel to primary windings 78 and 79. The opposite terminals of secondary windings 82 and 83 of transformer 80 are connected respectively to the grids 84 and 85 of a pair of electronic amplifier tubes 86 and 87, provided with cathodes 88 and 89 and anodes 90 and 91, respectively. While shown as two separate amplifier tubes, tubes 86 and 87 may be combined in a duel tube having a common cathode.

Anodes 90 and 91 are each connected to one terminal of relay operating coils 73 and 74. The opposite terminals of the coils are connected, through junction point 92, to one terminal of the secondary winding 93 of a transformer 94. The primary winding 95 of transformer 94 is connected to a source of alternating current which, for control purposes, is the same reference source to which rotor winding 23 is connected, and may be that represented by the leads 16 in Figs. 1 and 2. The other terminal of secondary winding 93 is connected by conductor 96 to the common junction point of secondary windings 82 and 83. Cathodes 88 and 89 are interconnected through biasing resistor 97 to conductor 96.

The use of differential relay 79 is an important feature in the circuit of the invention, as it contributes greatly to the accuracy, sensitivity and stability of control. The single pivoted armature 89, common to both relay coils 73 and 74, prevents accidental simultaneous energizing of motor 30 for reverse directions of rotation at the same time, as might occur were two separate relay armatures used. Under "null" conditions, the effective bias of grids 84 and 85 is such that tubes 86 and 87 are activated to pass a relatively small current through coils 73 and 74. In a typical practical example, such current might be of the order of six milli-amperes. As the same current passes through both relay coils, the effect on pivoted armature 89 is balanced. When a control signal is impressed on transformer 80 in response to relative displacement of rotors 23 and 24, the current flowing through one tube is increased and that through the other tube is decreased. For example, such increase and decrease in current might be of the order of two milli-amperes. The effective current through the selectively operated one of the relay coils would then be eight milli-amperes whereas that through the other relay coil will be reduced to four milli-amperes. The net relay or differential current operating the relay armature will therefore be four milli-amperes.

The described effect greatly increases the sensitivity of response in the control circuit of differential relay 79 as compared to two separate relays. Under the same conditions, the current normally flowing through separate relays under "null" conditions must be reduced in value to prevent accidental operating of the separate relay armatures. If the current through one of such separate relays is increased due to the imposition of a signal voltage on transformer 80, the decrease in current through the other relay will not assist in operation of the selected relay armature. Accordingly, a pair of separate relays require a greater signal voltage to be impressed on grid transformer 80 to effectively operate their armatures. It will thus be apparent that the use of differential relay 79 contributes greatly to the accuracy, stability and sensitivity of the control system of the present invention.

The operation of the system so far described is as follows. Upon a displacement of rotor winding 23 through movement of selector knob 27, an alternating current "control" voltage is induced in rotor winding 24 and impressed through leads 34 upon primary windings 78 and 79 of transformer 80. Through secondary windings 82 and 83 of the transformer, a proportionately higher voltage is impressed on grids 84 and 85 of electronic tubes 86 and 87. Depending upon the direction of displacement of winding 23 from its previous "null" position, one or the other of tubes 86 or 87 will become more conductive, depending upon the direction of the displacement, and the other less conductive. The anodes 88, 90 of both tubes are energized in the same phase relation by transformer 94. Grid transformer secondary windings 82 and 83 displace the control signal to grids 84, 85 by 180°. The sense or phase of the resultant control signal will accordingly be in phase with the anode voltage of one or the other tube 86, 87 and render them selectively more or less conductive than normal. Of course, the grids may be energized in-phase, and the anodes out-of-phase, if desired.

Accordingly, the current through one or the other of relay coils 73 or 74 will be increased and that through the other decreased to engage armature section 75 or 76 with contact 71 or 72 dependent on the phase of the control voltage, or sense of rotor 23 displacement. This operation effects energization of clutch unit 35 and motor 30 through one of its field windings 66 or 67 in such a direction as to cause the motor to rotate in the direction to operate member 20 and bring receiver rotor winding 24 into null relation with transmitter rotor winding 23. When the rotor windings are again in null relation, which occurs when movable member 20 coincides in relative position with selector knob 27, the input voltage to grid primary windings 78 and 79 will be reduced to zero or null, thus conditioning tubes 86 or 87 to balance the current through coils 73 and 74. The motor circuit is thus broken at armature contact 71 or 72, and clutch-brake unit 35 operates to substantially instantaneously stop actuator 45 and movable member 20, as will be hereinafter described in more detail.

Despite such substantially instantaneous action of clutch-brake unit 35 in disconnecting motor 30 from member 20, there may be a tendency for motor 30 to move rotor winding 24 beyond the null position. This will induce a reversely directed counter signal voltage into primary windings 78 and 79 causing the other of tubes 86 or 87 to become more conductive and thus energizing the relay 79 to operate motor 30 in the reverse direction before a steady state is reached. A suitable anticipation or anti-hunting means is provided to prevent such tendency to hunt in the system.

In the system shown in Fig. 3, the counter or anti-hunt signal is provided in the following manner. Fixed resistances 98 and 100 are connected in series with grids 84 and 85, respectively. Condensers 101 and 102 are connected in parallel with resistances 98 and 100, respectively. Normally, grids 84 and 85 are so biased, with respect to cathodes 88 and 89 by the voltage drop through resistor 97, that a small current flows through both coils 73 and 74. When rotors 23 and 24 are in the null position, the currents in both coils are balanced, due to the symmetrical connections of the circuit, and the effect of the coils on relay armature 89 is balanced. Thus relay armature 89 remains in the neutral position. Upon relatively large displacements of position selector 10 with respect to movable member 20, an appreciable control signal is impressed on grids 84 and 85 from rotor 24 through transformer 80 and depending upon the phase of the control signal biases one of the grids to a point sufficient to render one of the tubes 86 or 87 more conductive and the other less conductive. The particular tube rendered more conductive depends on the relative displacement of rotors 23, 24, as the reference voltage is impressed in phase opposition on the grids 84, 85 and in in-phase relation on the anodes 90, 91 of tubes 86, 87.

When the control signal is impressed on the grids, they conduct current through resistances 98 and 100 during part of each alternating current cycle. Condensers 101 and 102 are therefore charged to a voltage equal to the peak voltage drop across resistors 98 and 100. As the voltage drop across resistor 97 is only a relatively small amount, the voltage across condensers 101 and 102 will be nearly equal to the peak voltage impressed across secondary windings 82 and 83 of transformer 80. The counter signal thus stored in condensers 101 and 102 substantially corresponds to the amount of relative displacement of position selector 10 and movable member 20.

When motor 30, becoming energized, rotates rotor 24 back toward the null position, the charge on condensers 101 and 102 slowly leaks off through resistors 98 and 100, respectively. The counter potential thus impressed on condensers 101 and 102 is of a polarity such that it opposes the positioning control signal voltage impressed on grids 84 and 85 from rotor 24. The effective potential of grids 84 and 85 is thus held below that which would normally be produced by the control signal from rotor 24 acting along. This prematurely reduces the plate current in one tube to normal and increases that in the other tube to normal, causing the currents in coils 73 and 74 to become balanced before the "null" position is reached, moving armature 89 to its neutral or balanced position.

Movement of rotor winding 24 then stops, with the winding in a non-null relation with winding 23. The charge on condensers 101 and 102 continues to leak off through resistances 98 and 100. Accordingly, after a short interval of time, the effective value of the signal voltage applied to grids 84 and 85 exceeds the value of the counter potential. This will again condition differential relay 79 to effect energization of motor 30. Motor 30 again moves rotor 24 towards a null position with rotor 23, until such time as the counter signal potential again exceeds the signal applied to the grids. The result of the two actions described is to effect a continuous "chattering-in" or "stepping-in" of motor 30 and hence of rotor 24 into final or null position, with no resulting hunting or overshooting.

This "anticipation" effect compensates for the inertia of the moving system and for the time delay in the operation of differential relay 79 and thus gives the rotor 24 an opportunity to coast into any new or "null" position without overshooting. Both grids 84 and 85 are similarly affected by the resistance and condenser combinations, so that the current through both relay coils is held below the normal or "null" value for a short time after the signal impressed on the grids by rotor 24 reaches its very small "normal" or "null" value.

The effect of this particular arrangement is to broaden the null or dead zone through deenergizing relay 79 before "slave" rotor 24 has moved back into null relation with "master" rotor 23. However, the disclosed anticipation arrangement is effective only for relatively larger displacements of rotor 23 with respect to rotor 24 i. e. of a few degrees of arc, wherein the control signal generated is near or at a peak value. On small angular rotor displacements, there is not sufficient signal magnitude or time for a counter signal of effective value to be stored in condensers 101 and 102.

Fig. 4 illustrates an embodiment of the invention in which the anticipation or anti-hunt arrangements are provided effective for both small and large displacements of the position selector with respect to the movable member. To simplify the drawing, signal transmitter 15, signal receiver 55 and their connections, to the left of the vertical dot and dash lines of Fig. 4, have been omitted, but it is to be understood that such connections are identical with those in Fig. 3. In the embodiment shown in Fig. 4, the signal from rotor winding 24 is impressed upon the primary winding 104 of transformer 105. The opposite terminals of the secondary winding 106 of transformer 105 are connected to grids 84, 85 of tubes 86, 87. Plates 90, 91 of tubes 86, 87 are connected to one terminal of relay operating coils 73 and 74, respectively, and the opposite terminals of these coils are connected, through junction point 92, to one terminal of the secondary winding 93 of transformer 94. The opposite terminal of secondary winding 93 is connected through fixed resistance 97 to the common junction of cathodes 88, 89. A condenser 107 is connected between the mid-point of secondary 106 of transformer 105 and the junction point of cathodes 88, 89. A pair of resistances 108 and 110 are connected in series with each other and in parallel with secondary winding 106. A conductor 111 connects the junction point of resistances 108 to ground 112, which is connected to the junction point of resistance 97 and secondary winding 93 of transformer 94.

The operation of the system shown in Fig. 4 in effecting energization of motor 30 is the same as that previously described. However, the anticipation and anti-hunt arrangements are different from those in Fig. 3. Upon increase in the conductivity of one of the tubes 86 or 87, due to the impression of a control signal from grid transformer 105 on the grids thereof, the grid current flow in two paths is increased. One of these paths includes grid 84 or 85, condenser 107, and cathode 88 or 89. The other path includes grids 84 or 85, resistance 108 or 110, conductor 111, resistance 97 and cathode 88 or 89. The effect of these grid currents is to build up a potential on condenser 107 during displacement of signal transmitter 15 with respect to signal receiver 55. When the motor 30 starts to drive rotor 24 back into coincidence with rotor 23, the potential on condenser 107 discharges through resistances 108 and 110. The relative direction of such discharge is such as to cause a counter potential to build up on grid 84 or 85 in a direction to oppose the signal potential applied thereto from grid transformer 105.

The charge of condenser 107 does not leak off as fast as the signal voltage decreases due to movement of rotor 24 toward null relation with rotor 23. Accordingly, before the two rotors have reached their "null" position, the counter voltage impressed on the grids by condenser 107 will exceed the signal voltage and thus condition tubes 86 and 87 to deenergize differential relay 79 before motor 30 has moved the movable member into coincidence with position selector 10.

The value of such charge stored in condenser 107 corresponds to the amount of relative displacement from null of rotor 23 with respect to rotor 24. In practical operation, this counter signal effects a "chattering-in" or "stepping-in" of motor 30 into the final position. That is, the counter signal overcomes the signal impressed on the grids from rotor 24 effecting deenergization of the motor. The charge on condenser 107, however, continues to be dissipated through resistances 108 or 110. Accordingly, a short time later, the signal voltage from rotor 24 will be sufficiently greater than the counter potential to condition tubes 86 and 87 to reenergize differential relay 79. This process repeats itself until such time as motor 30 obtains its final position wherein rotor 24 is in null relation with rotor 23 and movable member 20 is in coincidence with position selector 10.

As explained in connection with Fig. 3, however, the anticipation effect thus described is effective only on the relatively larger displacements of rotor 23 with respect to rotor 24, some time being needed for an effective charge to be built up on condenser 107. The additional anti-hunt means incorporated in the circuit of Fig. 4 effects anticipation and anti-hunt control on relatively small displacements on rotor 23 with respect to rotor 24. A pair of resistances 113 and 114 are connected in series across front contacts 71 and 72 of differential relay 79, and thus in parallel with motor field windings 66 and 67. A conductor 115 connects the junction point 116 of these resistances to the junction point of cathodes 88 and 89 through an adjustable resistance 117.

The anti-hunt arrangement for small displacements operates in the following manner. At the null position, or for very small voltage signals corresponding to small angular displacement of rotors 23 and 24, relay armatures 75 and 76 are disengaged from both contacts 71 and 72, and the total current of tubes 86 and 87 divides between two parallel paths from the junction point of cathodes 88 and 89 to ground 112. The first path comprises merely the usual cathode resistor 97. The second path comprises resistance 117, resistances 113 and 114, field windings 66 and 67, clutch 35, motor armature 65 and ground 118. When the displacement of rotors 23 and 24 is sufficient to impress a signal on grids 84 and 85 of sufficient magnitude to condition tubes 86 and 87 to operate relay armature 89, the positive terminal of battery 70 is connected to one of the motor fields 66 or 67, through contact 71 or 72, and thus to one of the resistances 113 or 114. This effects reversal of current through one of the resistances 113 or 114 and through resistance 117, so that the current through the first mentioned path—that is, cathode resistor 97—is quickly increased.

The corresponding increase of voltage drop from cathodes 88 and 89 to ground 112, in effect makes the potential of grids 84 and 85 more negative than normal. This causes the plate currents to decrease, restoring relay armature 89 to its balanced or neutral position after giving motor 30 only a very brief impulse of power. This "kick-out" or motor feed back effect compensates for the inertia of the moving system and for the time delay in the operation of the relay, thus allowing rotor 24 and movable member 20 to be moved in very small "steps" or "nibbles" for precise positioning. Under ideal conditions, the smallest steps should be just sufficient to return rotor 24 to the null position, assuming an initial displacement from null of rotors 23 and 24 just sufficient to cause operation of relay 79. The "dead" zone, or "inactive" zone, or "null" zone under these conditions has a breadth corresponding to twice the smallest step of the moving system. Accordingly, the circuit of Fig. 4 effects anticipation and thus inhibits hunting of motor 30 with both relatively large and relatively small displacements of rotor 23 with respect to rotor 24.

Fig. 5 illustrates another embodiment which the invention may assume in practice. As in Fig. 4, signal transmitter 15 and signal receiver 55 and their connections, to the left of the vertical dot and dash line of Fig. 5, have been omitted, but it is to be understood that such connections are identical with those in Fig. 3. In Fig. 5, the signal from rotor winding 24 is impressed through leads 24 upon the primary winding 120 of a grid transformer 121. One terminal of secondary winding 122 is connected to ground at 123. The other terminal of secondary winding 122 is connected in common to grids 84 and 85 in series with a resistance 124 and a condenser 125 connected in parallel with each other. Plates 90 and 91 of tubes 86 and 87 are each connected to one terminal of operating coils 73 or 74 of differential relay 79 and the opposite terminals of the coils are connected to the opposite terminals of a secondary winding 126 of a plate transformer 127. Primary winding 128 of transformer 127 receives current from the source 16 of Figs. 1 and 2. The mid-point of secondary winding 127 is connected to ground at 112. Cathodes 88 and 89 are connected in parallel to ground 112 through rheostat 130 and resistor 131. A voltage limiting means, such as a grid glow tube 132, is connected across secondary winding 122 of transformer 121 to limit the peak control voltage applied to the control system.

In the circuit of Fig. 5 it will be noted that a common series parallel connection of resistance and condenser is used for both grids, as distinguished from the circuit shown in Fig. 3 where a separate combination is used for each grid, or that shown in Fig. 4 where a separate resistance is used for each grid. Likewise, the grids are connected in in-phase relation to transformer 121 and the anodes in phase opposition to transformer 127. The anticipation effect on relatively large displacements of rotor 23 with respect to rotor 24 is the same as that of Fig. 3. That is, during displacement of rotor 23 a potential builds up across condenser 125 which, when motor 30 starts to rotate rotor 24 into angular null relation with rotor 23, is dissipated through resistance 124. However, the rate of dissipation is less than the rate at which the control signal decreases so that, as rotors 23 and 24 approach a null position, the counter signal overcomes the control signal and effects stepping-in or chattering-in of the motor in the manner previously described.

Similarly, there are normally two paths from cathodes 88, 89 to ground when the signal is at null, as in Fig. 4. One path includes rheostat 130, resistance 131 and ground 112. The other path includes rheostat 117, resistances 113 and 114 in parallel, field windings 66 and 67 in parallel, clutch winding 35, motor armature 65 and ground 116. Upon engagement of relay armature 89 with either contact 71 or 72, the flow of current through rheostat 117 is reversed resulting in an increased flow of current through resistances 130 and 131. This makes control grids 84 and 85 more negative than usual, effecting the above mentioned stepping-in of the motor in small "nibbles" to the final position.

It will be noted that in all three circuits, condensers 135 and 136 are connected in parallel with relay operating coils 73 and 74, respectively. These condensers afford a parallel by-pass path for alternating current in the circuit including tubes 86 and 87 and coils 73 and 74. Thus, only a uni-directional current flows through coils 73 and 74 which inhibits humming or chattering of relay 79. In the circuit of Fig. 5, condensers 137 and 138 are connected in parallel with front contacts 71 and 72, respectively. These condensers afford a discharge path for the transient current during opening or closing movement of the relay armatures, thus preventing pitting and burning of the armature and its associated contacts 71 and 72.

An important feature of the present invention is the electromagnetic clutch and brake unit 35 provided for connecting motor 30 to jack screw 45. As explained above, the clutch and brake unit is in electric circuit relation with motor 30 so that it is energized when motor 30 is energized to instantly couple the motor to the jack screw actuator. When motor 30 is deenergized, clutch unit 35 is immediately deenergized and instantly brakes the actuator and associated elements. This action is very effective for preventing overshooting and hunting of the motor drive and of the control system. The effect of motor armature momentum is minimized. The electromagnetic clutch and brake unit 35 preferably is of the type described and claimed in Patent No. 2,267,114, entitled "Electromagnetic clutch," issued December 23, 1941, or of the type described and claimed in Patent No. 2,401,003, granted May 28, 1946, to William P. Lear, for "Electromagnetic clutch," both assigned to the same assignee as the present invention. For the purpose of illustration, the electromagnetic clutch and brake unit described in said Patent No. 2,401,003 is illustrated in Fig. 6.

Referring to Fig. 6, the electromagnetic clutch and brake unit 35 includes a driven member 140 of magnetic material having a hub portion 141 keyed to the shaft 142 of armature 65 of motor 30. Armature shaft 142 is provided with a reduced extension 143. Mounted on extension 143 is driven clutch member 144 likewise of magnetic material and having a hub portion 145 concentric with extension 143 and supported thereon through ball bearing 146. Hub portion 145 is provided with a reduced extension 147 which is mounted on ball bearing 148 in a member 150 disposed in housing 151. Pinion 47 is mounted in the outer end of extension 147. A housing 151' of magnetic material surrounds hub portion 141 of driven member 140, the housing being completed by an extension 152 of housing 150.

Mounted in the compartment thus formed is a magnetizing winding 153 which is preferably connected in electric circuit relation with motor 30 either in series or parallel relation. A brake surface 154 of suitable material, such as cork, is mounted in housing 150 adjacent driven clutch member 144. A spring 155 surrounding armature shaft extension 143 abuts driving member 140 and ball bearing assembly 146 to normally urge driven member 144 into engagement with brake surface 154. As described in said Patent No. 2,267,114, driving member 140 may be provided with one or more inserts 156 of non-magnetic material to increase the number of magnetic flux interlinkages between the driving and driven members of the clutch.

Upon energization of winding 153, driven member 144 is magnetically attracted into frictional and magnetic coaction with driving member 140 to couple armature shaft 142 to pinion 47. The magnetic attraction between the driving and driven members overcomes the force of spring 155. Upon deenergization of winding 153, which preferably occurs simultaneously with deenergization of motor 30, spring 155 snaps driving disk 144 into instantaneous engagement with braking surface 154. This instantly disconnects motor 30 from pinion 47 and effects immediate stopping of the driven system connected to pinion 47. Armature 65 of motor 30 may rotate at a decreasing rate due to the stored kinetic energy without moving pinion 47. Accordingly, any tendency for the driven system connected to pinion 47 to hunt on either side of the null position is effectively inhibited due to the instantaneous braking action of clutch and brake unit 35 when motor 30 is deenergized in response to the control signal reaching zero when signal transmitter 15 and signal receiver 55 are in coincidence. The clutch and brake unit is particularly effective in small or "inching" movements of the system.

While specific embodiments of the invention have been described for the purpose of illustrating the principles thereof, it will be obvious to those skilled in the art that the invention may be otherwise embodied without departing from such principles.

What is claimed is:

1. A position control system for a movable member comprising, in combination, an electric motor operable to position the member forwardly or reversely; switch means operable to connect said motor to a source of power; electronic tube means arranged in push-pull for controlling the operation of said switch means; means, including circuit connections, for impressing a control signal voltage on the control grids of said tube means to operate said switch means to effect energization of said motor, the phase of said voltage corresponding to a forward or reverse movement of said member respectively whereby one or the other sides of said tube means is effectively in control of movement of the member; means connected in the grid circuit of said tube means for storing a counter signal potential corresponding to the magnitude of the signal voltage, the counter signal potential opposing the signal voltage and overcoming the same before the movable member attains a position corresponding to the control signal to operate said switch means to effect deenergization of said motor to inhibit hunting of the movable member; and means operable in response to operation of said switch means to increase the negative bias of said control grids to deenergize said motor, before the movable member attains a position corresponding to the control signal, to inhibit hunting of the movable member.

2. A remote positioning control system for a movable member comprising, in combination, a position selector; a signal transmitter operatively associated with said selector; an actuator effective to position the movable member forwardly or reversely; an electric motor; mechanism including relay means operable to connect said motor to a source of power and to said actuator; a signal receiver operatively associated with said actuator; electrical means connecting said receiver and said transmitter; electronic tube means arranged in push-pull and connected in circuit with said relay means and a source of alternating current; means including a circuit connection for impressing a control voltage on the grids of said tube means in response to signals derived by said receiver from said transmitter when said selector and the movable member are out of coincidence to selectively condition said tube means to correspondingly selectively operate said mechanism to energize said motor and connect it to said actuator for rotation in a direction to restore coincidence between the movable member and said selector, the phase of said voltage corresponding to a forward or reverse movement of said member respectively whereby one or the other sides of said tube means is effectively in control of movement of the member; means connected in the grid circuit of said tube means for storing a counter signal potential corresponding to the relative displacement of said transmitter and receiver, the counter signal potential opposing the control voltage impressed on said grids, during movement of said member into coincidence with said selector, and overcoming the control voltage when the member approaches coincidence with the selector to condition said tube means to operate said mechanism to deenergize said motor and disconnect it from said actuator to inhibit hunting of the movable member; and means operable in response to energization of said mechanism to increase the negative bias of the grids of said tube means to condition said tube means to deenergize said motor before said selector and movable member have been restored to coincidence to inhibit hunting of the movable member.

3. A remote positioning control system for a movable member comprising, in combination, a position selector; a signal transmitter operatively associated with said selector; an actuator effective to position the movable member forwardly or reversely; a direct current electric motor; relay means operable to connect said motor to a source of direct current; an electromagnetic clutch operable upon energization of said motor to connect the same to said actuator and, upon deenergization of said motor to disconnect the same from said actuator, and brake means effective upon deenergization of said motor to arrest motion of said actuator and the movable member; a signal receiver operatively associated with said actuator; electrical means connecting said receiver and said transmitter; electronic tube means arranged in push-pull and connected in circuit with said relay means and a source of alternating current; means including circuit connections for impressing a control voltage on the grids of said tube means in response to signals derived by said receiver from said transmitter when said selector and the movable member are out of coincidence to selectively condition said tube means to correspondingly selectively operate said relay means to energize said motor and connect it to said actuator for rotation in a direction to restore coincidence between the movable member and said selector, the phase of said voltage corresponding to a forward or reverse movement of said member respectively whereby one or the other sides of said tube means is effectively in control of movement of the member; a first anti-hunting circuit arrangement comprising means connected in the grid circuit of said tube means for storing a counter signal potential corresponding to the relative displacement of said transmitter and receiver, the counter signal potential opposing the control voltage impressed on said grids, during movement of said member into coincidence with said selector and overcoming the control voltage when the member approaches coincidence with the selector to condition said tube means to operate said relay means to deenergize said motor and disconnect it from the source of direct current and said actuator to inhibit hunting of the movable member; a second anti-hunting circuit arrangement comprising means operable in response to energization of said relay means to impress a positive potential from the source of direct current on the cathodes of said tube means to increase the relative negative bias of the grids thereof to condition said tube means to operate said relay means to deenergize said motor before said selector and the movable member have been restored to coincidence to inhibit hunting of the movable member; said first arrangement being effective upon relatively large relative displacements of said transmitter and receiver and said second arrangement being effective upon relatively small relative displacements of said transmitter and receiver.

4. A remote positioning control system for a movable member comprising, in combination, a position selector; a signal transmitter operatively associated with said selector; an actuator effective to position the movable member forwardly or reversely; a reversible direct current motor; mechanism, including a differential relay having a pair of operating coils and a pivoted armature selectively operable to connect said motor to a direct current source and to said actuator for operation in either direction; a pair of electronic tube paths each connected in series with one of said coils and a reference source of alternating current; a signal receiver operatively associated with said actuator; electrical means connecting said receiver and said transmitter; means including circuit connections for impressing an alternating current potential from the reference source upon said transmitter and receiver; a transformer; circuit means connecting the terminals of the secondary winding of said transformer to the grids of said tube paths; circuit means for impressing a control voltage on the primary winding of said transformer in response and proportional to signals derived by said receiver from said transmitter when said selector and the movable member are out of coincidence to impress a control potential upon the grids of said electronic tube paths to selectively condition said tube paths to energize said mechanism, including said differential relay, to connect said motor to the direct current source for operation of said actuator in a direction to restore coincidence between the movable member and said selector, the phase of said voltage corresponding to a forward or reverse movement of said member respectively whereby one or the other sides of said tube means is effectively in control of movement of the member; a pair of resistances connected in series across the terminals of said secondary winding; circuit means including an impedance connecting the common junction of said resistances to the cathodes of said tube paths; and a condenser connected between the mid-point of said secondary winding and said cathodes; said condenser, during relative displacement of said selector and the movable member, storing a charge corresponding to the control potential and, during operation of said motor to restore coincidence, dissipating the charge through said resistances at a rate less than the rate of decrease of the control potential, whereby a counter potential is impressed upon said grids sufficient to overcome the control potential before coincidence is restored to effect deenergization of said motor to inhibit hunting thereof.

5. A remote positioning control system for a movable member comprising, in combination, a position selector; a signal transmitter operatively associated with said selector; an actuator effective to position the movable member forwardly or reversely; a reversible direct current motor; a differential relay having a pair of operating coils and a pivoted armature selectively operable to connect said motor to a direct current source for operation in either direction; an electromagnetic clutch operable, upon energization of said motor, to connect the same to said actuator and, upon deenergization of said motor, to disconnect the same from said actuator; brake means effective upon deenergization of said motor to instantly arrest operation of said actuator and movable member; a pair of electronic tube paths each connected in series with one of such coils and a reference source of alternating current; a signal receiver operatively associated with said actuator; electrical means connecting said receiver and said transmitter; means including circuit connections for impressing an alternating current potential from the reference source upon said transmitter and receiver; a transformer; circuit means connecting the terminals of the secondary winding of said transformer to the grids of said tube paths; circuit means for impressing a control voltage on the primary winding of said transformer in response and corresponding in phase to signals derived by said receiver from said transmitter when said selector and the movable member are out of coincidence to impress a control potential upon the grids of said electronic tube paths to selectively condition said tube paths to operate said relay to move its armature to energize said motor and connect it to said actuator for operation thereof in a direction to restore coincidence between the movable member and the selector; a pair of resistances in series across the terminals of said secondary winding; circuit means including an impedance connecting the common junction of said resistances to the cathodes of said tube paths; and a condenser connected between the midpoint of said secondary winding and said cathodes; said condenser, during relative displacement of said selector and the the movable member, storing a charge corresponding to the control potential and, during operation of said motor to restore coincidence, dissipating the charge through said resistances at a rate less than the rate of decrease of the control potential, whereby a counter potential is impressed upon said grids sufficient to overcome the control potential before coincidence is restored to effect deenergization of said motor and operation of said brake means to inhibit hunting of the movable member.

6. A remote positioning control system for a movable member comprising, in combination, a position selector; a signal transmitter operatively associated with said selector; an actuator effective to position the movable member; a reversible direct current motor; a differential relay having a pair of operating coils and a pivoted armature selectively operable to connect said motor to a direct current source for operation in either direction; an electromagnetic clutch operable, upon energization of said motor, to connect the same to said actuator and, upon deenergization of said motor, to disconnect the same from said actuator; brake means effective upon deenergization of said motor paths to instantly arrest operation of said actuator and movable member; a pair of electronic tubes each connected in series with one of such coils and a reference source of alternating current; a signal receiver operatively associated with said actuator; electrical means connecting said receiver and said transmitter; means including circuit connections for impressing an alternating current potential from the reference source upon said transmitter and receiver; a transformer; circuit means connecting the terminals of the secondary winding of said transformer to the grids of said tube paths; circuit means for selectively impressing a control voltage on the primary winding of said transformer in response and corresponding to signals derived by said receiver from said transmitter when said selector and the movable member are out of coincidence to impress a control potential upon the grids of said electronic tube paths to selectively condition said tube paths to operate said relay to move its armature to energize said motor and connect it to said actuator for operation thereof in a direction to restore coincidence between the movable member and the selector; a first anti-hunting circuit arrangement comprising a pair of resistances connected in series across the terminals of said secondary winding, circuit means including an impedance connecting the common junction of said resistances to the cathodes of said tube paths, a condenser connected between the midpoint of said secondary winding and said cathodes, said condenser, during relative displacement of said selector and the movable member, storing a charge corrsponding to the control potential and, during operation of said motor to restore coincidence, dissipating the charge through said resistances at a rate less than the rate of decrease of the control potential, whereby a counter potential is impressed upon said grids sufficient to overcome the control potential before coincidence is restored to effect deenergization of said motor and operation of said brake means to inhibit hunting of the movable member; and a second anti-hunting circuit arrangement comprising circuit connections operative, upon such movement of the relay armature, to impress a relatively positive potential from said direct current source upon said cathodes to increase the relative negative bias of said grids to condition said tube paths to effect deenergization of said motor and operation of said brake means before coincidence is restored between the movable member and said selector to inhibit hunting of the movable member; said first arrangement being effective upon relatively large relative displacements of said transmitter and receiver and said second arrangement being effective upon relatively small relative displacement of said transmitter and receiver.

7. A remote positioning control system for a movable member comprising, in combination, a position selector; a signal transmitter operatively associated with said selector; an actuator effective to position the movable member; a reversible direct current motor; a differential relay having a pair of operating coils and a pivoted armature selectively operable to connect said motor to a direct current source for operation in either direction; an electromagnetic clutch operable, upon energization of said motor, to connect the same to said actuator and, upon deenergization of said motor, to disconnect the same from said actuator; brake means effective upon deenergization of said motor paths to instantly arrest operation of said actuator and movable member; a pair of electronic tubes each connected in series with one of such coils and a reference source of alternating current; a signal receiver operatively associated with said actuator; electrical means connecting said receiver and said transmitter; means including circuit connections for impressing an alternating current potential from the reference source upon said transmitter and receiver; a transformer; circuit means connecting one terminal of the secondary winding of said transformer to electrical ground; a condenser connecting the other secondary winding terminal to the grids of said tubes; a resistance connected in parallel with said condenser; circuit means connecting the cathodes of said tube paths to electrical ground; circuit means for selectively impressing a control voltage on the primary winding of said transformer in response and corresponding to signals derived by said receiver from said transmitter when said selector and the movable member are out of coincidence to impress a control potential upon the grids of said electronic tube paths to selectively condition said tube paths to operate said relay to move its armature to energize said motor and connect it to said actuator for operation thereof in a direction to restore coincidence between the movable member and the selector; said condenser, during relative displacement of said selector and the movable member, storing a charge corresponding to the control potential and, during operation of said motor to restore coincidence, dissipating the charge through said resistance at a rate less than the rate of decrease of the control potential, whereby a counter potential is impressed upon said grids sufficient to overcome the control potential before coincidence is restored to effect deenergization of said motor and operation of said brake means to inhibit hunting of the movable member.

JEAN M. ROBERTS.

REFERENCES CITED

The following references are of record in the file of this patent:

UNITED STATES PATENTS

| Number | Name | Date |
|---|---|---|
| 1,942,587 | Whitman | Jan. 9, 1934 |
| 2,040,014 | Moseley | May 5, 1936 |
| 2,085,442 | Newell | June 29, 1937 |
| 2,154,375 | Chambers | Apr. 11, 1939 |
| 2,256,482 | Isbister | Sept. 23, 1941 |